United States Patent
Lawson

(10) Patent No.: US 8,113,573 B2
(45) Date of Patent: Feb. 14, 2012

(54) SEAT ARTICULATION MECHANISM

(75) Inventor: Bobby Wayne Lawson, Walnut Cove, NC (US)

(73) Assignee: BE Aerospace, Inc., Wellington, FL (US)

( * ) Notice: Subject to any disclaimer, the term of this patent is extended or adjusted under 35 U.S.C. 154(b) by 401 days.

(21) Appl. No.: 12/536,008

(22) Filed: Aug. 5, 2009

(65) Prior Publication Data

US 2010/0032994 A1 Feb. 11, 2010

Related U.S. Application Data

(60) Provisional application No. 61/086,342, filed on Aug. 5, 2008.

(51) Int. Cl.
*A47C 1/02* (2006.01)
(52) U.S. Cl. ............... 297/68; 297/75; 297/118; 297/83
(58) Field of Classification Search .................... 297/68, 297/75, 83, 84, 114
See application file for complete search history.

(56) References Cited

U.S. PATENT DOCUMENTS

| | | | | |
|---|---|---|---|---|
| 5,823,614 A * | 10/1998 | Johnson et al. | ............. | 297/85 C |
| 6,089,593 A * | 7/2000 | Hanson et al. | ................ | 280/650 |
| 6,315,319 B1 * | 11/2001 | Hanson et al. | ................ | 280/650 |
| 6,692,069 B2 * | 2/2004 | Beroth et al. | ................ | 297/118 |
| 6,726,279 B1 * | 4/2004 | Figel et al. | .................... | 297/340 |
| 6,846,042 B2 * | 1/2005 | Hanson et al. | ........... | 297/411.36 |

* cited by examiner

*Primary Examiner* — David Dunn
*Assistant Examiner* — Erika Garrett
(74) *Attorney, Agent, or Firm* — Shumaker, Loop & Kendrick, LLP

(57) ABSTRACT

A seat articulation mechanism including a seat pan member that travels along a pathway defined in a seat articulation linkage as the entire mechanism translates between an upright and sleeping configuration through a lounge configuration. The mechanism further includes main and secondary translation linkages, one of which is driven by a single actuator to drive the mechanism between the upright and sleeping configurations.

19 Claims, 15 Drawing Sheets

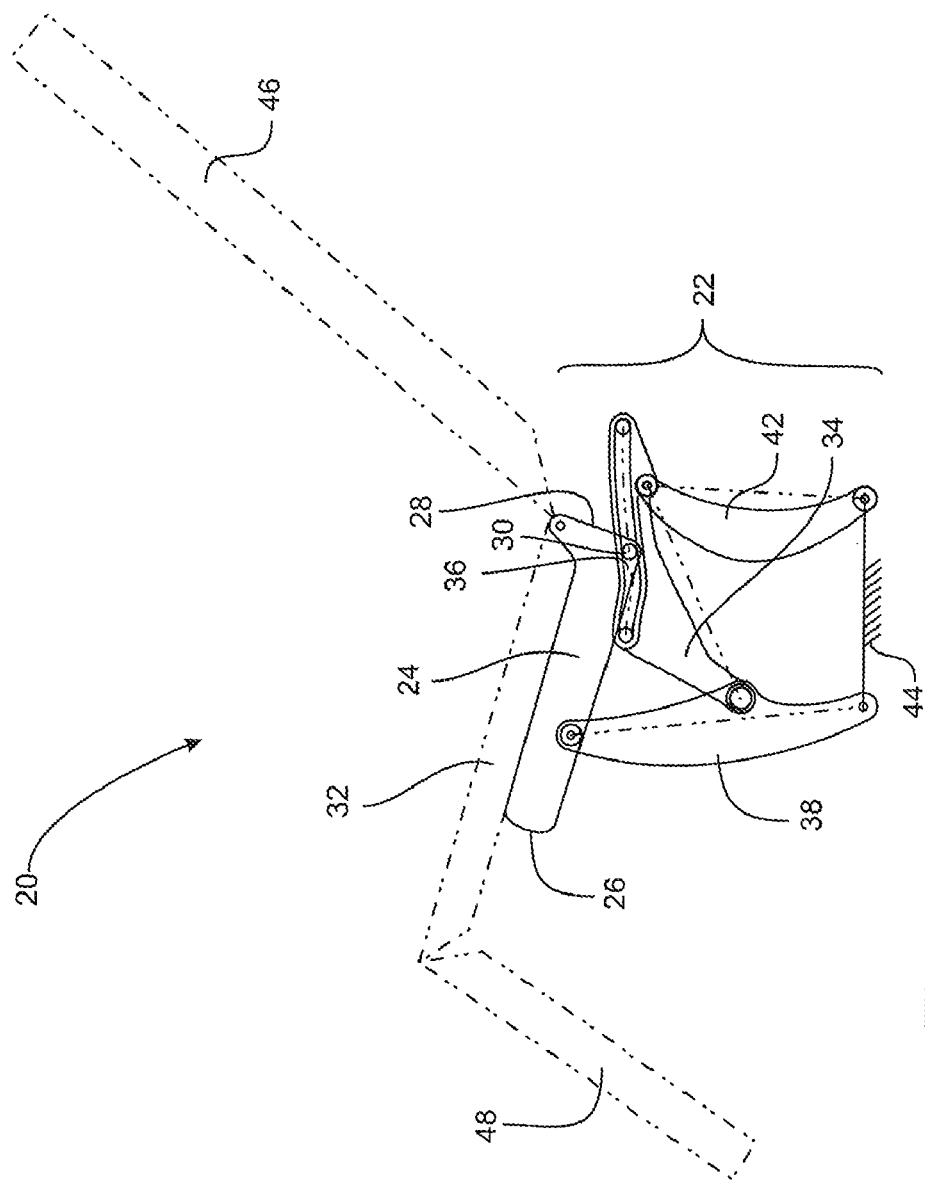

SEAT ARTICULATION MECHANISM

CROSS-REFERENCE TO RELATED APPLICATIONS

This application claims priority to U.S. Provisional Patent Application Ser. No. 61/086,342 filed Aug. 5, 2008 entitled "SEAT ARTICULATION MECHANISM", the contents of which are incorporated by reference herein.

TECHNICAL FIELD AND BACKGROUND OF THE INVENTION

1. Field of the Invention

The present invention relates generally to the field of aircraft seat design, and more particularly, to a seat articulation mechanism in which the motion of the seat pan member is controlled by a seat pan articulation linkage pathway as the entire assembly translates from the upright to sleeping configuration.

2. Background of the Invention

To provide the type of amenities commensurate with the premiums paid for first class passenger seating, seat designers are continuously looking for ways to improve passenger comfort. Specific areas of comfort that are being developed include providing a maximum passenger living space, arranging seating units to provide privacy between units while maximizing available cabin space, and the comfort of the seat itself, among others. It is with regard to seat comfort and achieving various seat configurations that the present invention finds particular application.

Premium passenger seats are typically designed to provide various seat configurations including, but not limited to, an upright configuration for taxi, takeoff and landing, a generally horizontal configuration for sleeping, also commonly referred to as a "lie flat" configuration, as well as various degrees of recline therebetween. In the upright configuration, the seat back is positioned generally vertically, and in seat designs including a lower leg rest support, that support member is typically positioned generally vertically as well. The upright configuration is intended to brace the upper torso and lower legs of the seat occupant against forces that may be caused by sudden movement or impact. In the sleeping configuration, the seat back pivots rearward and the leg rest pivots forward relative to the seat pan to provide a generally planar, horizontal sleeping surface. The various configurations achieved intermediate the upright and sleeping configurations are collectively referred to herein as the "lounge configuration," also referred to herein as a "reclined" or "Z-seating" configuration. In the lounge configuration, the seat back and leg rest portions are typically positioned somewhere intermediate their upright and sleeping positions.

In this regard, provided herein is a seat designed to achieve upright, sleeping, and lounge configurations by way of a seat articulation mechanism that obviates the need for specially programmed and controlled actuators for directly controlling seat pan motion. By incorporating a slot and roller programmed into the mechanism to provide the seat pan movement, the pathway may be steepened to provide greater angles in the seat pan in the lounge configuration, and flattened to provide a lesser angle, and the pathway may be tuned based on the customer's preference and different angles may be provided by simply interchanging the seat pan articulation linkage.

BRIEF SUMMARY OF THE INVENTION

Accordingly, in one aspect a premium aircraft passenger seat is provided.

In another aspect, a passenger seat is provided designed to achieve upright, lounge and sleeping seat configurations.

In yet another aspect, a passenger seat is provided including a seat articulation mechanism that obviates the need for multiple actuators for controlling seat pan movement.

In yet another aspect, the seat articulation mechanism includes a seat pan articulation linkage defining an articulation control pathway that may be customized to adjust the angle of the seat pan in the lounge configuration.

In yet another aspect, movement of the seat pan member carrying the seat bottom is controlled by the pathway of the seat pan articulation linkage.

In yet another aspect, a seat articulation mechanism is provided in which the seat pan member translates as the entire assembly moves from the upright to the sleeping configuration.

In yet another aspect, a seat articulation mechanism is provided designed to provide greater backrest motion.

In yet another aspect, movement of the seat pan causes it to rise up in the lounge configuration, higher than when in the upright configuration, to increase the distance between the seat pan and a back shell to provide room for reclining the backrest.

In yet another aspect, a seat articulation mechanism is provided in which seat pan motion is independent of backrest motion, and each is controlled through its own actuator.

In yet another aspect, the single actuator is extended when the seat is in the upright configuration and retracted when in the sleeping configuration.

In yet another aspect, the actuator includes a locking system for locking the actuator.

To achieve the foregoing and other aspects and advantages, a seat articulation mechanism is provided including a seat pan member having first and second opposed ends and having a seat pan roller for facilitating movement attached about the second end, a seat pan articulation linkage defining an articulation control pathway along which the seat pan roller travels as the seat articulation mechanism translates between an upright and a sleeping configuration through a lounge configuration, a main translation linkage pivotally connected to the seat pan member, the seat pan articulation linkage, and a stationary frame member, a secondary translation linkage pivotally connected to the seat pan articulation linkage and the stationary frame member, and an actuator for driving the motion of at least one of the main and the secondary translation linkages to drive the mechanism between the upright and sleeping configurations through the lounge configuration.

Moving between configurations, the seat pan member translates forward relative to the seat pan articulation linkage as the seat articulation mechanism translates between the upright and sleeping configurations. Further, the first end of the seat pan member moves upwardly in the lounge configuration relative to its position in the upright configuration, and moves downwardly in the sleeping configuration relative to its position in the upright configuration. The articulation control pathway controls the angle of the seat pan member and may be modified to provide different angle configurations for the lounge configuration.

In another embodiment, the seat articulation mechanism includes first and second seat pan members each having first and second opposed ends and including a seat pan roller positioned about the second end of the first and second seat pan members, first and second seat pan articulation linkages each defining an articulation control pathway along which the seat pan rollers travel as the seat articulation mechanism translates between an upright and a sleeping configuration through a lounge configuration, first and second main translation linkages pivotally connected to the first and second seat pan members, the first and second seat pan articulation linkages, and first and second stationary frame members, respectively, first and second secondary translation linkages pivotally connected to the first and second seat pan articulation linkages and the first and second stationary frame members, and an actuator for driving the motion of at least one of the first and second main and secondary translation linkages to drive the mechanism between the upright and sleeping configurations through the lounge configuration.

In a further embodiment, an aircraft passenger seat is provided including the seat articulation mechanism provided in the above embodiment and further including a seat back pivotally connected to the first and second seat pan members configured to pivot between an upright position and a generally horizontal sleeping position, and a leg rest configured to move between an upright position and a generally horizontal sleeping position.

Additional features and advantages of the invention will be set forth in the detailed description which follows, and in part will be readily apparent to those skilled in the art from that description or recognized by practicing the invention as described herein.

BRIEF DESCRIPTION OF THE DRAWINGS

These and other features, aspects and advantages of the present invention are better understood when the following detailed description of the invention is read with reference to the accompanying drawings, in which:

FIG. 7 is a schematic sectional view of the seat of FIG. 1 shown in the lounge configuration;

DETAILED DESCRIPTION OF THE INVENTION

Figure 1:
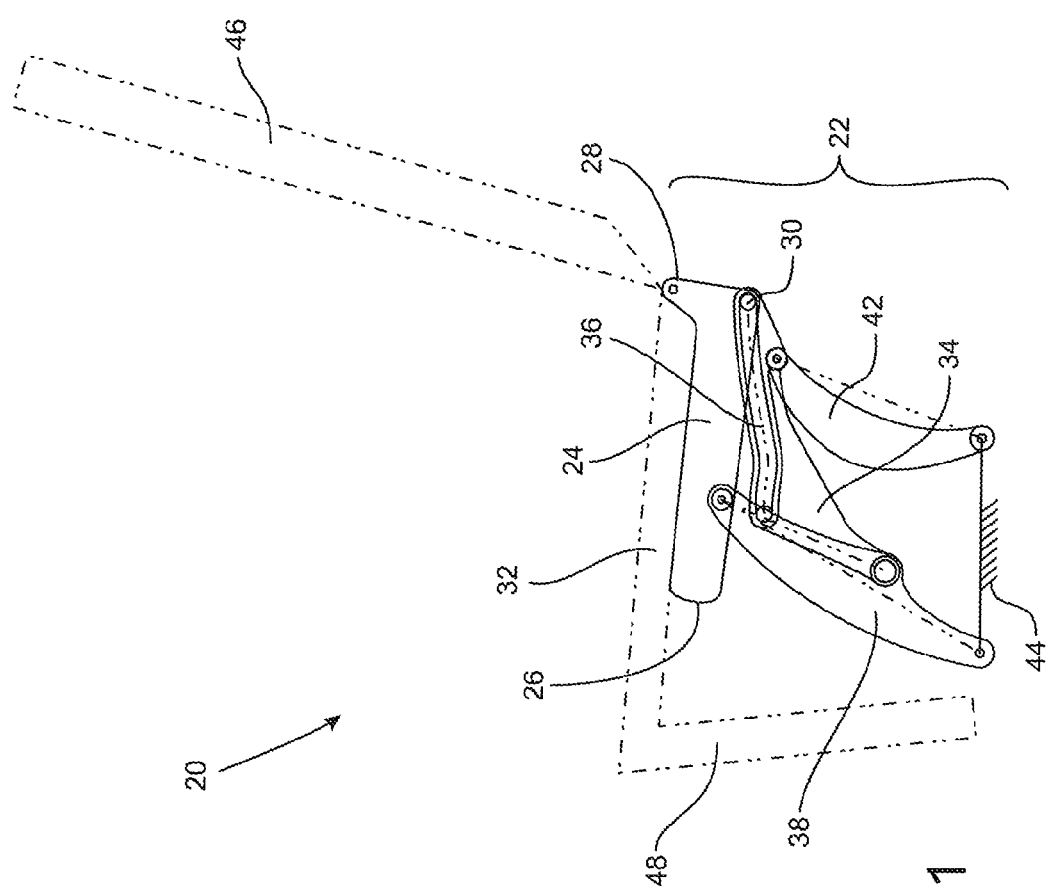
FIG. 1 is a schematic sectional view of a seat shown in an upright configuration.

The present invention will now be described more fully hereinafter with reference to the accompanying drawings in which an exemplary embodiment of the invention is shown. However, the invention may be embodied in many different forms and should not be construed as limited to the representative embodiment set forth herein. The exemplary embodiment is provided so that this disclosure will be both thorough and complete, and will fully convey the scope of the invention and enable one of ordinary skill in the art to make, use and practice the invention.

Referring now to the drawings, a seat articulation mechanism for a passenger seat is provided. Although the preferred embodiment is described with reference to a premium aircraft passenger seat, it is intended that the mechanism or portions thereof may applied to additional types of seats outside the field of aircraft. The seat described herein is configured to move between and upright configuration and a sleeping configuration through a lounge configuration. In the upright configuration, typically intended for taxi, takeoff and landing, the seat back is generally vertically position and the leg rest portion retracted. In the sleeping configuration, the seat back is reclined to generally horizontal, and the leg rest extended to generally horizontal such that the leg rest, seat pan and seat back collectively form a generally planar, horizontal support surface. In the lounge configuration, the seat back is reclined to any position between its upright and sleeping position, and the leg rest is extended to any position between its upright and sleeping position.

Although the seat articulation mechanism 22 is described with reference to single components, the mechanism preferably includes first and seconds of seat pan members, seat pan articulation linkages, main translation linkages, and secondary translation linkages positioned on opposing sides of the seat for cooperatively providing seat pan movement while sufficiently supporting the seat pan. The first and seconds of each component may be interconnected with bracing, tubular frame members and other cross members to provide a sufficiently strong and stable mechanism. Opposing first and seconds members are preferably mirror images of one another. First and second members are referred to in the specification with a single reference number for clarity, and in the figures with a reference number and the same numbered followed by prime.

Referring to FIG. 1, a schematic illustration of the passenger seat is shown generally at reference numeral 20. The seat 20 is shown in the upright configuration and includes a seat articulation mechanism 22. A seat pan member 24 defines first and second opposed ends 26, 28 and carries a seat pan roller 30 attached about the second end 28. The seat pan member 24 supports a seat bottom 32 either directly or through additional components. The seat bottom 32 is shown in phantom lines as any seat bottom assembly may be supported on the seat pan member 24. A seat pan articulation linkage 34 defines an articulation control pathway 36 along a portion of its length along which the seat pan roller 30 travels as the seat articulation mechanism 22 translates between the upright and sleeping configurations through the lounge configuration. As shown, the roller 30 is positioned at one end of the articulation control pathway 36 when in the upright configuration. As described in detail below, the roller 30 is positioned at the opposite end of the articulation control pathway 36 when in the sleeping configuration, and positioned intermediate the opposing ends when in the lounge configuration.

Figure 2:
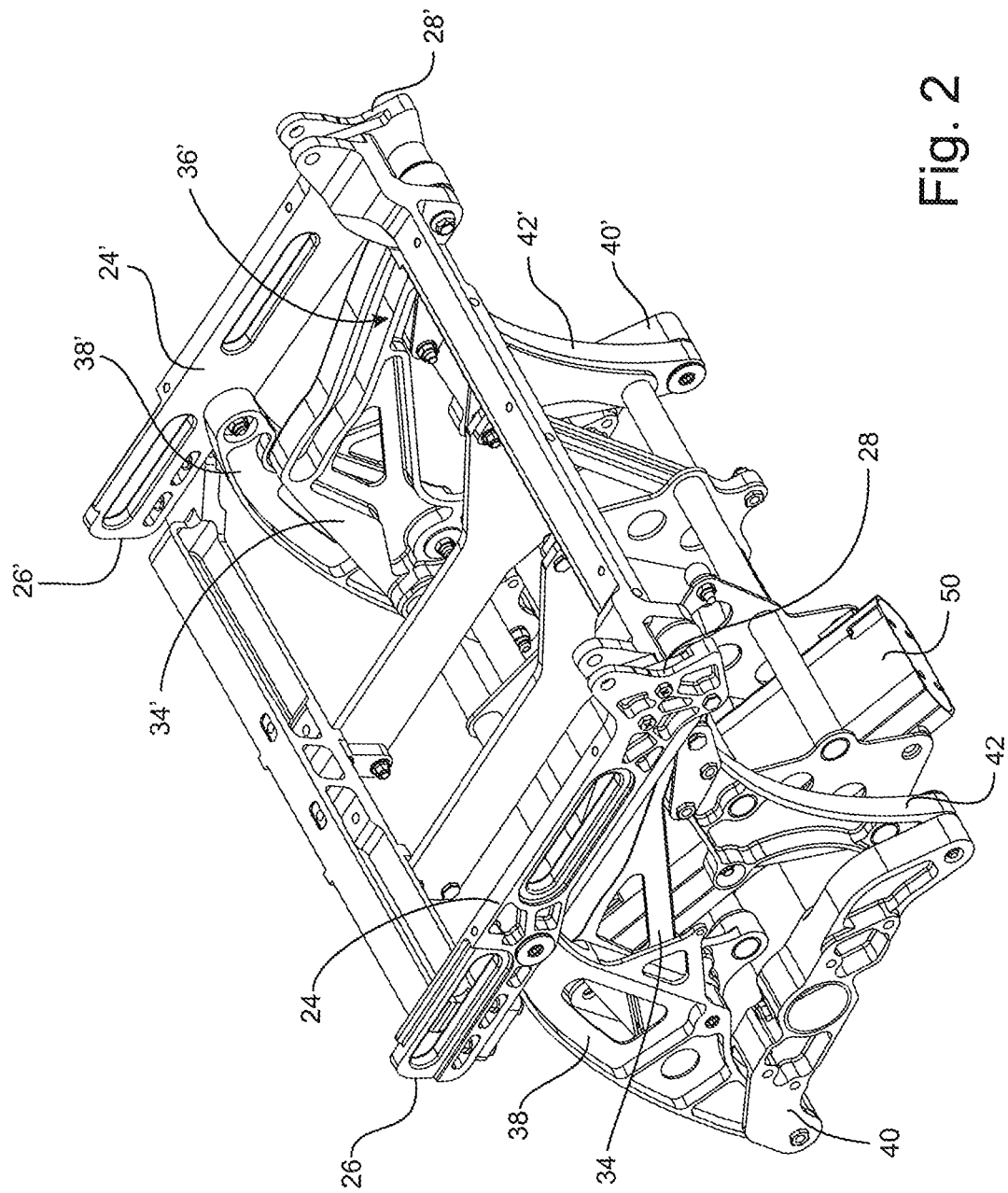
FIG. 2 is a first perspective view of a seat articulation mechanism including a seat pan articulation linkage defining a control pathway, wherein the mechanism is shown in the upright configuration.
Figure 3:
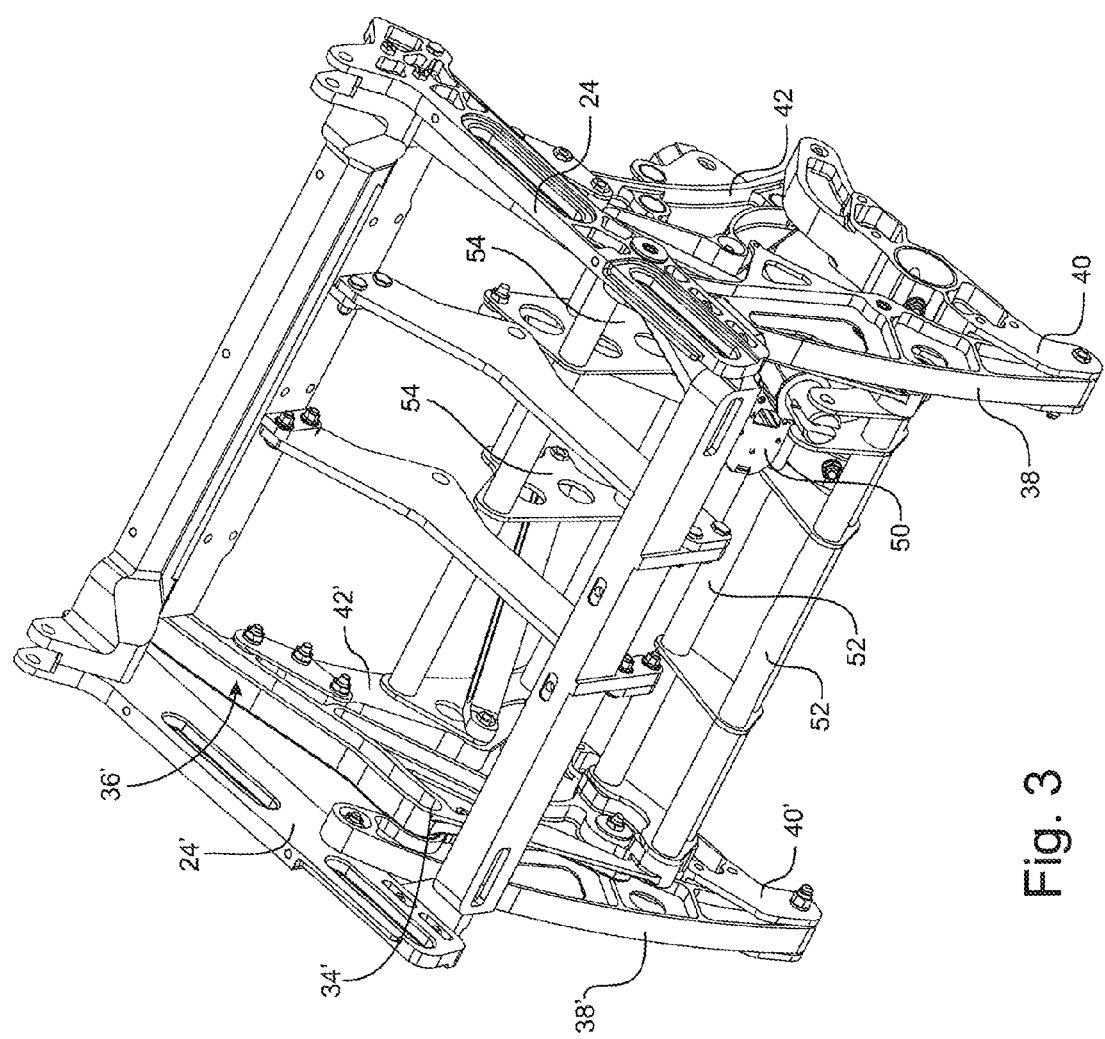
FIG. 3 is a second perspective view of the seat articulation mechanism of FIG. 2.
Figure 4:
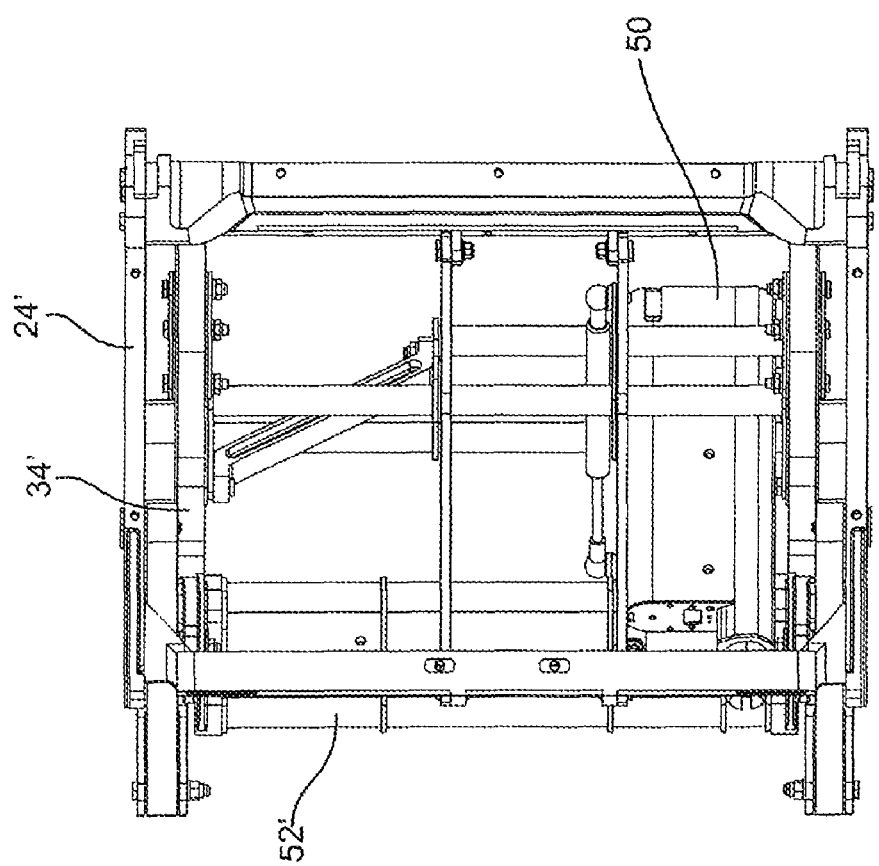
FIG. 4 is a top plan view of the seat articulation mechanism of FIG. 2.
Figure 6:
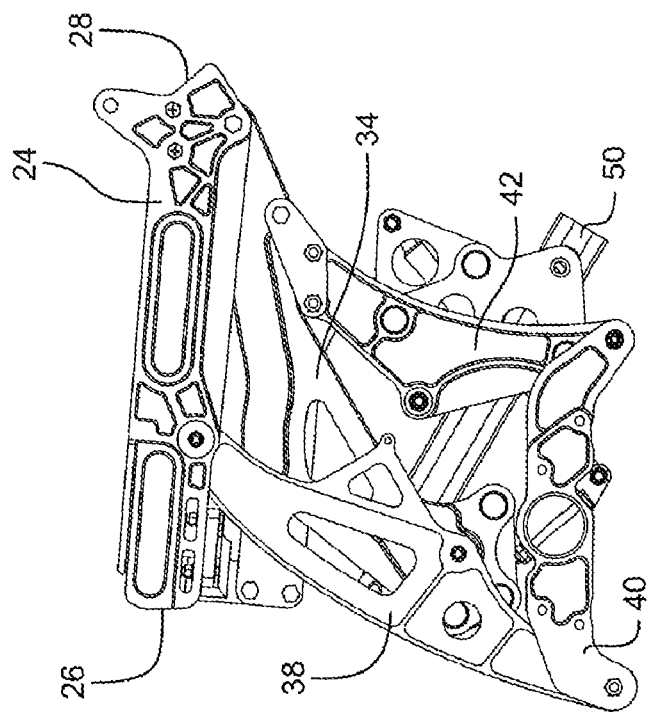
FIG. 6 is a side elevation view of the seat articulation mechanism of FIG. 2.
Figure 5:
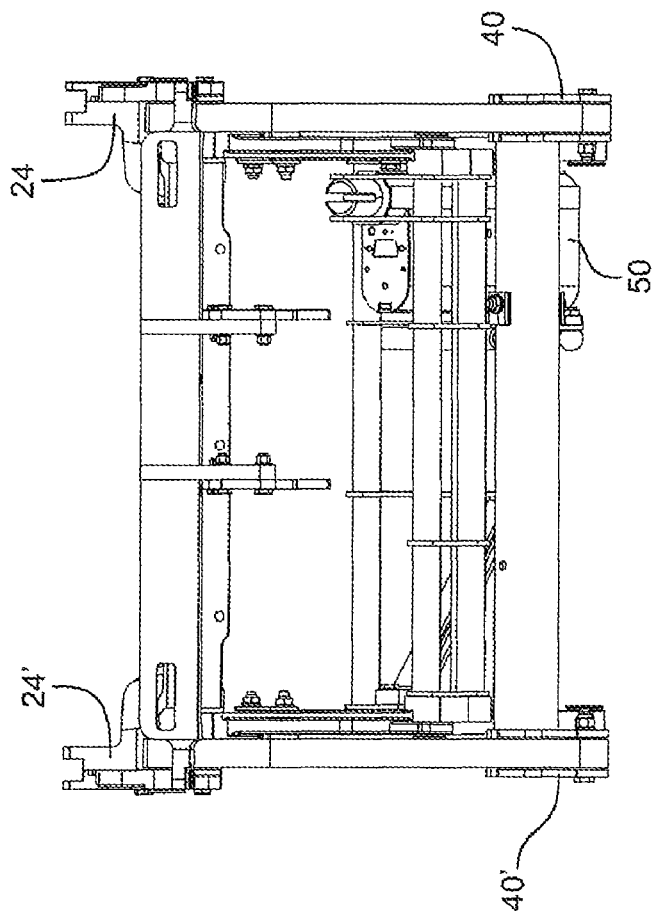
FIG. 5 is a front elevation view of the seat articulation mechanism of FIG. 2.
Figure 8:
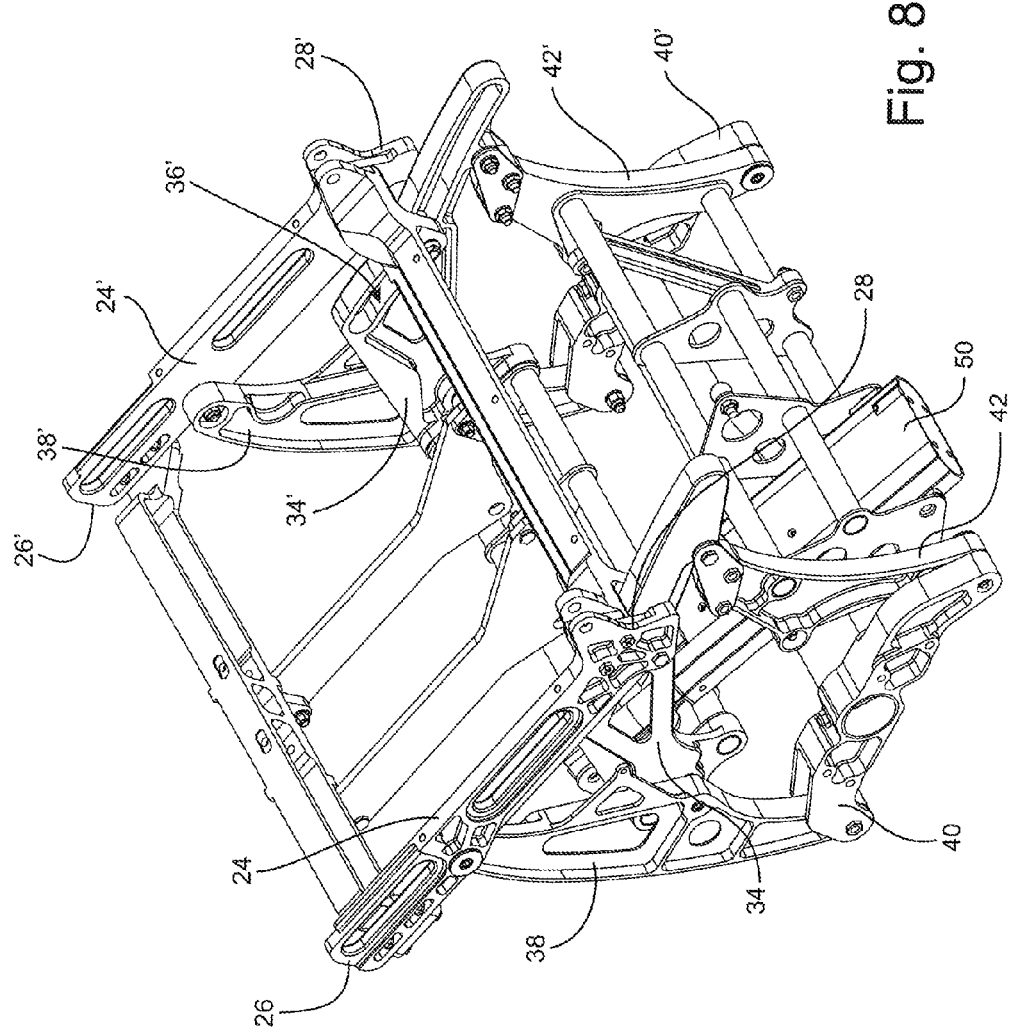
FIG. 8 is a first perspective view of the seat articulation mechanism of FIG. 2 shown in the lounge configuration.
Figure 9:
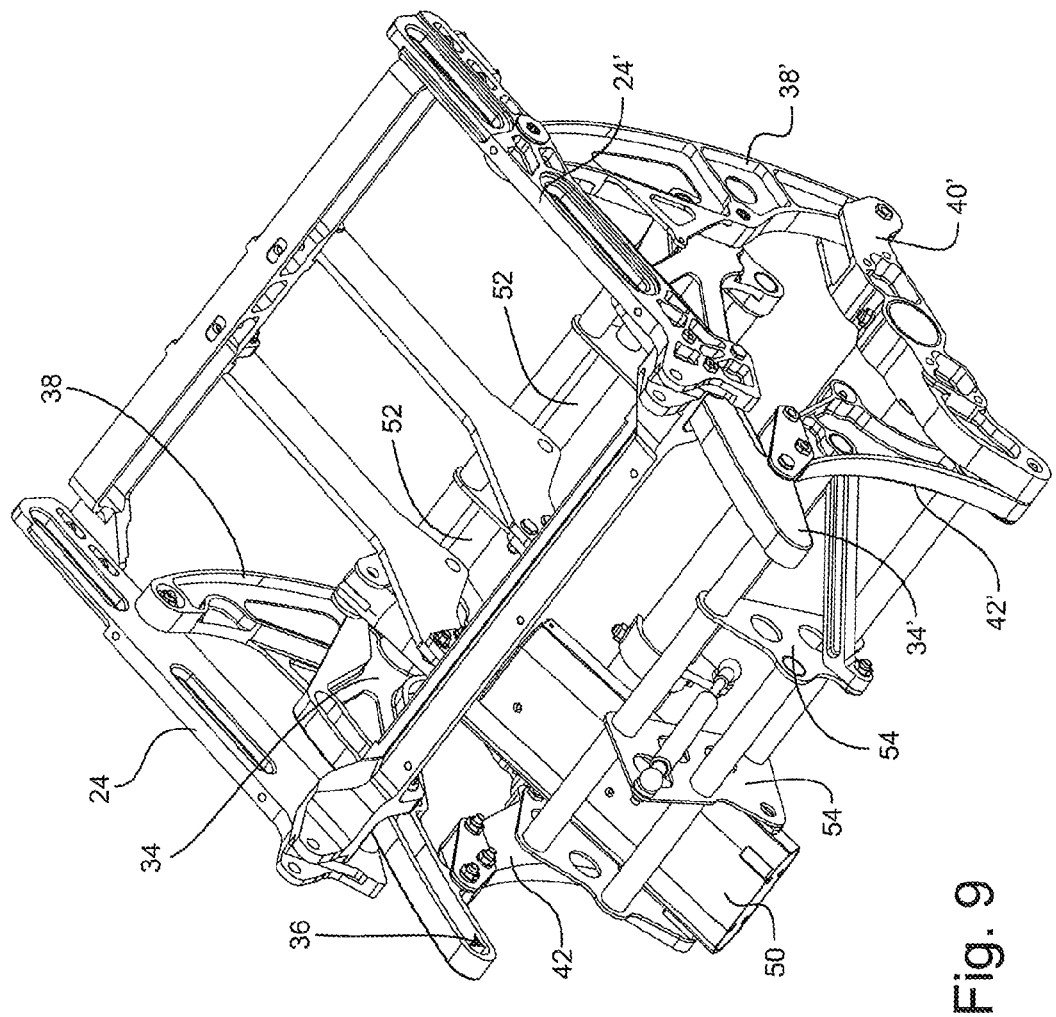
FIG. 9 is a second perspective view of the seat articulation mechanism of FIG. 8.
Figure 10:
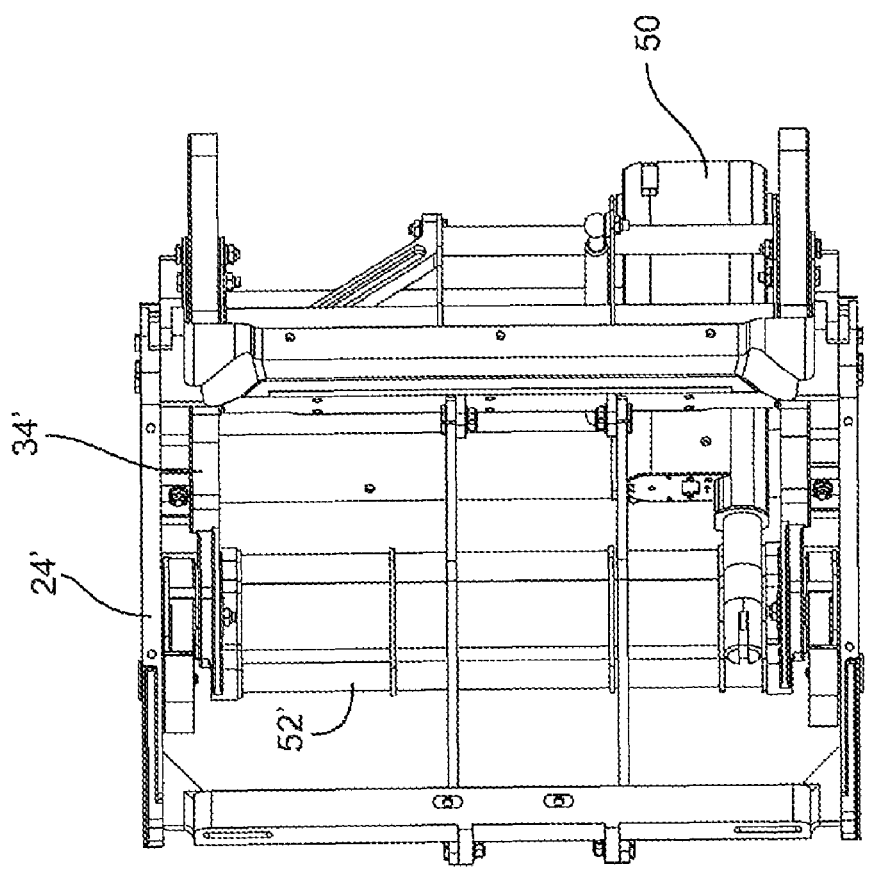
FIG. 10 is a top plan view of the seat articulation mechanism of FIG. 8.
Figure 12:
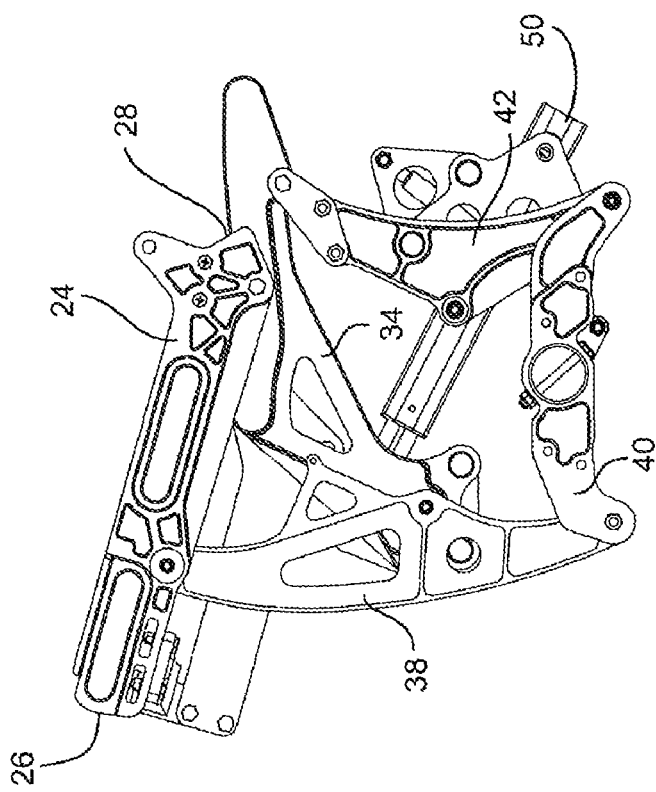
FIG. 12 is a side elevation view of the seat articulation mechanism of FIG. 8.
Figure 11:
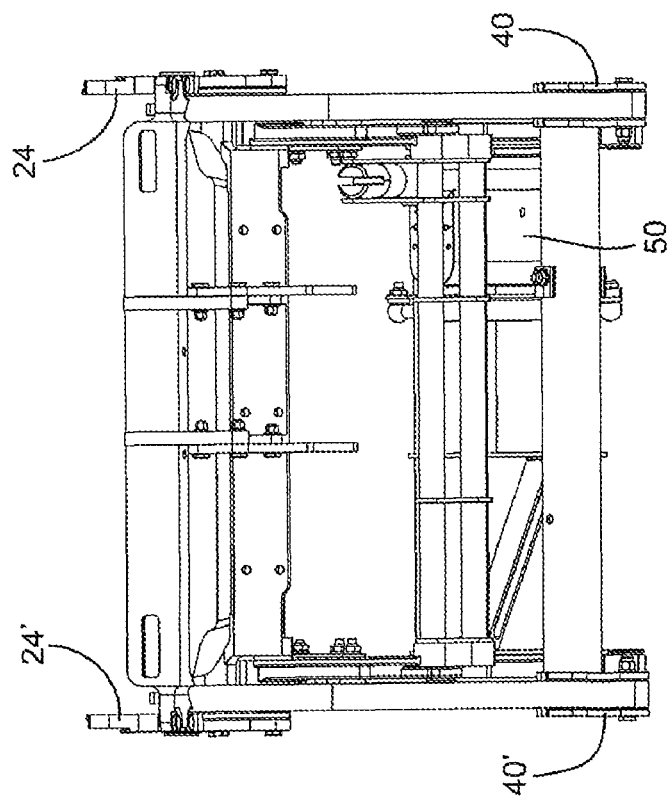
FIG. 11 is a front elevation view of the seat articulation mechanism of FIG. 8.

The seat articulation mechanism 22 further includes a main translation linkage 38 pivotally connected to the seat pan member 24, a first end of the seat pan articulation linkage 34, and a stationary frame member (FIG. 2 at 40). The stationary frame member 40 is ultimately secured to the cabin floor. A secondary translation linkage 42 is pivotally connected to a second end of the seat pan articulation linkage 34 as well as the stationary frame member 40. The main and secondary translation linkages 38, 42 may or may not connect to the same stationary frame member. In either embodiment, the translation linkages 38, 42 pivot at one end, and pivot and translate at the opposing end. The main and secondary translation linkages 38, 42 support the seat pan member 24 and seat pan articulation linkage 34 above the floor 44. The main translation linkage 38 is positioned forward of the secondary translation linkage 42 relative to the first end 26 of the seat pan member 24.

In the upright configuration, the seat pan member 24 is positioned with the first end 26 slightly raised relative to the second end 28 and the horizontal floor 44. This provides a slightly angled seat pan member 24 in which the passengers weight is moved rearward toward the seat back 46. As shown, the seat back 46 is pivotally connected about the second end 28 of the seat pan member 24. The seat back 46 is configured to move between upright (i.e. generally vertical) and sleeping (i.e. generally horizontal) sleeping positions through a lounge position. Although not forming a part of this invention, the seat back 46 preferably includes a frame covered with cushioning material and upholstery. Seat pan member motion is independent of seat back motion, and each is preferably controlled through its own actuator. Thus, the seat 20 may include four actuators, one for the seat back 46, one for the leg rest 48, one to extend the length of the seat pan for thigh support to accommodate occupants of varying heights, and one for seat pan as described in detail below.

Referring to FIGS. 2-6, various perspective and elevation views of the seat articulation mechanism 22 in the upright configuration are shown removed from the seat bottom, seat back and leg rest. Linear actuator 50 drives the motion of at least one of the main and the secondary translation linkages 38, 42 to drive the mechanism 22 between the upright and sleeping configurations through the lounge configuration. Movement of the seat is controlled by the movement of the seat pan member 24, seat pan articulation linkage 34, main translation linkage 38, and secondary translation linkage 42. The seat pan member 24 may be locked in the upright configuration by the secondary translation linkage 42 and the actuator 50. This arrangement obviates the need for specially programmed and controlled actuators for directly controlling the seat pan motion, as the articulation control pathway 36 and roller 30 are "programmed" into the mechanism to determine and provide the seat pan member 24 movement.

The articulation control pathway 36 (i.e. shape of the slot in the seat pan articulation linkage 34) determines the angle of the seat pan member 24 in the various seat configurations from upright through lounge through sleeping configurations. The curve in the pathway 36 may be steepened to provide greater angles in the seat pan member 24 in the lounge position, and flattened to provide a lesser angle. The pathway 36 is customizable in that it may be tuned based on the customer's preference and different angles may be provided by simply interchanging the seat pan articulation linkage 34.

The frame as shown includes multiple beams 52, wherein the front beam transfers downloads. Movement is driven off of the secondary translation linkage 42, but may also be driven off of the main translation linkage 38. The actuator 50 is fully extended when the seat 20 is in the upright configuration, and is fully retracted when the seat is in the sleeping configuration. Brackets 54 spread the load and pull the seat forward when the actuator moves.

Referring to FIG. 7, the seat 20 is shown in the lounge configuration. The movement of the seat pan member 24 causes the first end 26 (i.e. forward end) to rise upwardly, higher than in the upright configuration, to provide more room between the seat pan member 24 and a back shell associated with the seat, such that more room is provided to recline the seat back 46. Thus, the seat articulation mechanism is designed to provide greater seat back motion. As shown, as the seat pan member 24 translates from the upright to the lounge configuration, the seat pan member 24 moves forward relative to the seat pan articulation linkage 34 and the roller 30 travels forward within the pathway 36. The main and secondary translation linkages 38, 42 pivot forward relative to their ends connected to the stationary frame member 40 to a more vertical position, thus providing the increased height of the seat pan member 24 in the lounge configuration. As the main translation linkage 38 has a greater length than the secondary translation linkage 42, the first end 26 of the seat pan member 24 is raised higher than the second end 28. As stated above, the forward translating movement of the mechanism causes the seat pan member 24 to translate forward relative to the floor 44.

The seat pan member 24 is locked in the lounge configuration by the secondary translation linkage 42 and the linear actuator 50. An exemplary lounge angle is the longitudinal axis defined by the seat pan member 24 positioned at about 17 degrees from horizontal. As stated above, the pathway 36 determines the angle of the seat pan member 24 in the lounge configuration, and the curve may be steepened to provide greater angles in the seat pan member 24 in the lounge configuration, and flattened to provide a lesser angle.

Referring to FIGS. 8-12, various perspective and elevation views of the seat articulation mechanism 22 in the lounge configuration are shown and correspond to FIGS. 2-6 in which the seat articulation mechanism 22 is shown in the upright configuration.

Figure 13:
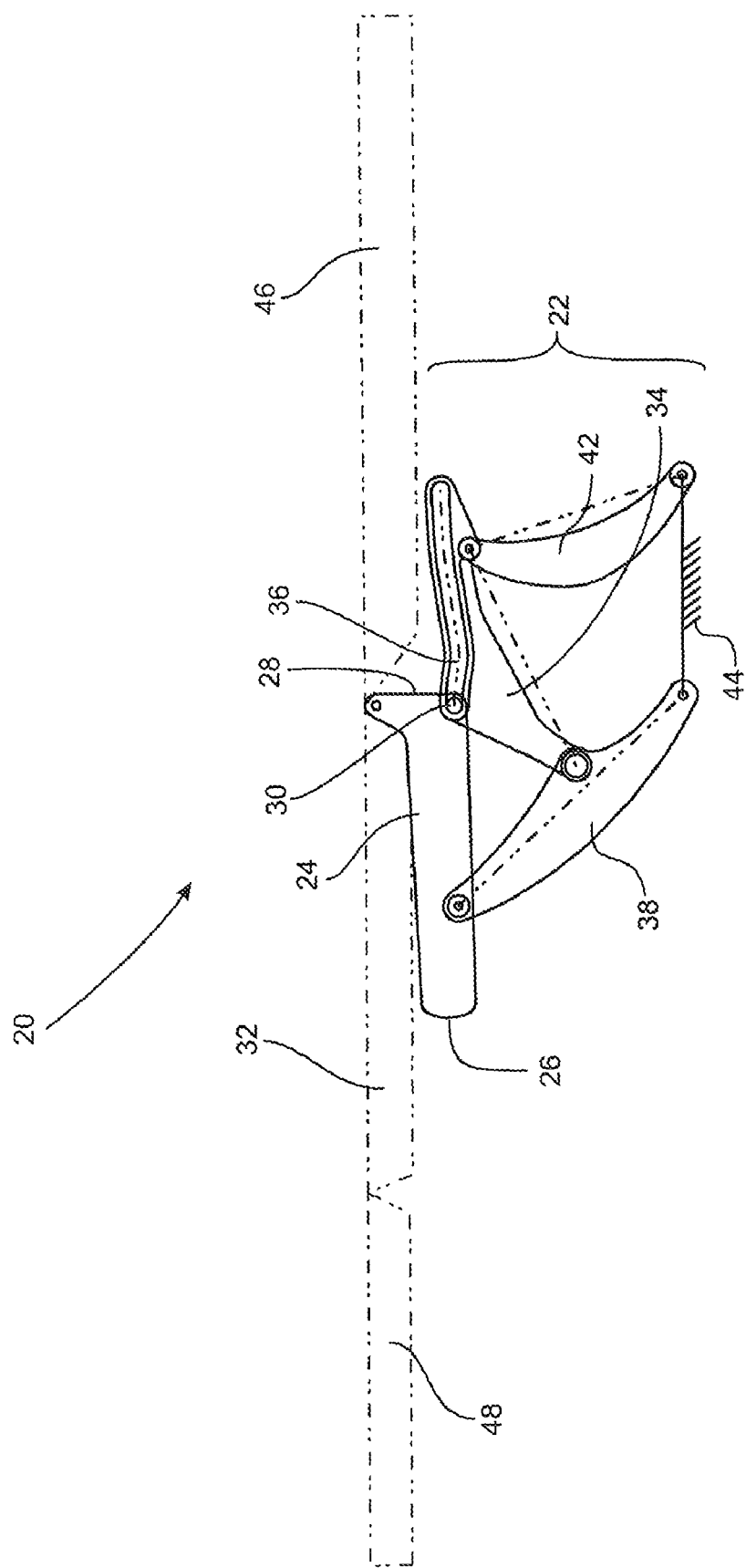
FIG. 13 is a schematic sectional view of the seat of FIG. 1 shown in the sleeping configuration.
Figure 14:
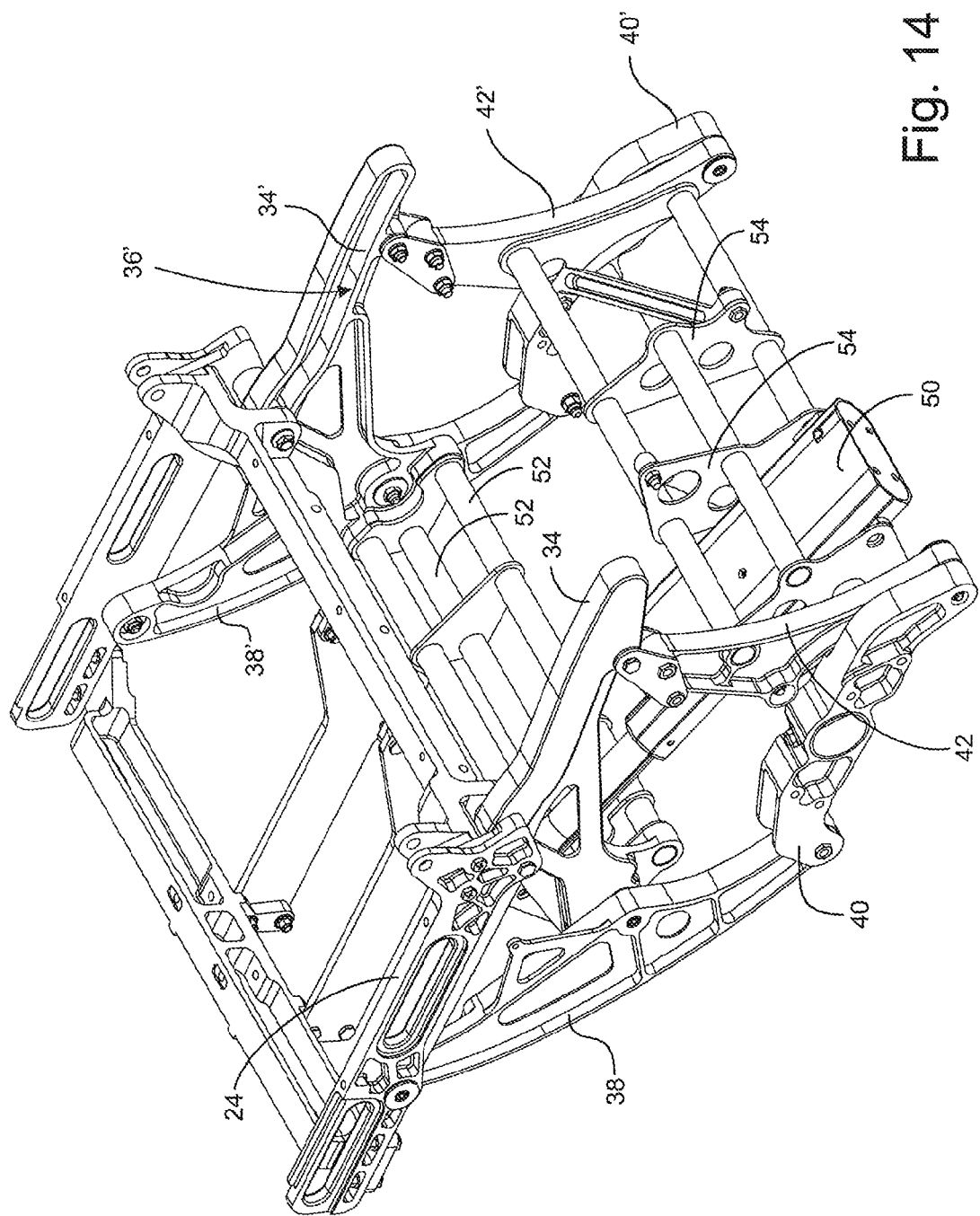
FIG. 14 is a first perspective view of the seat articulation mechanism of FIG. 2 shown in the sleeping configuration.
Figure 15:
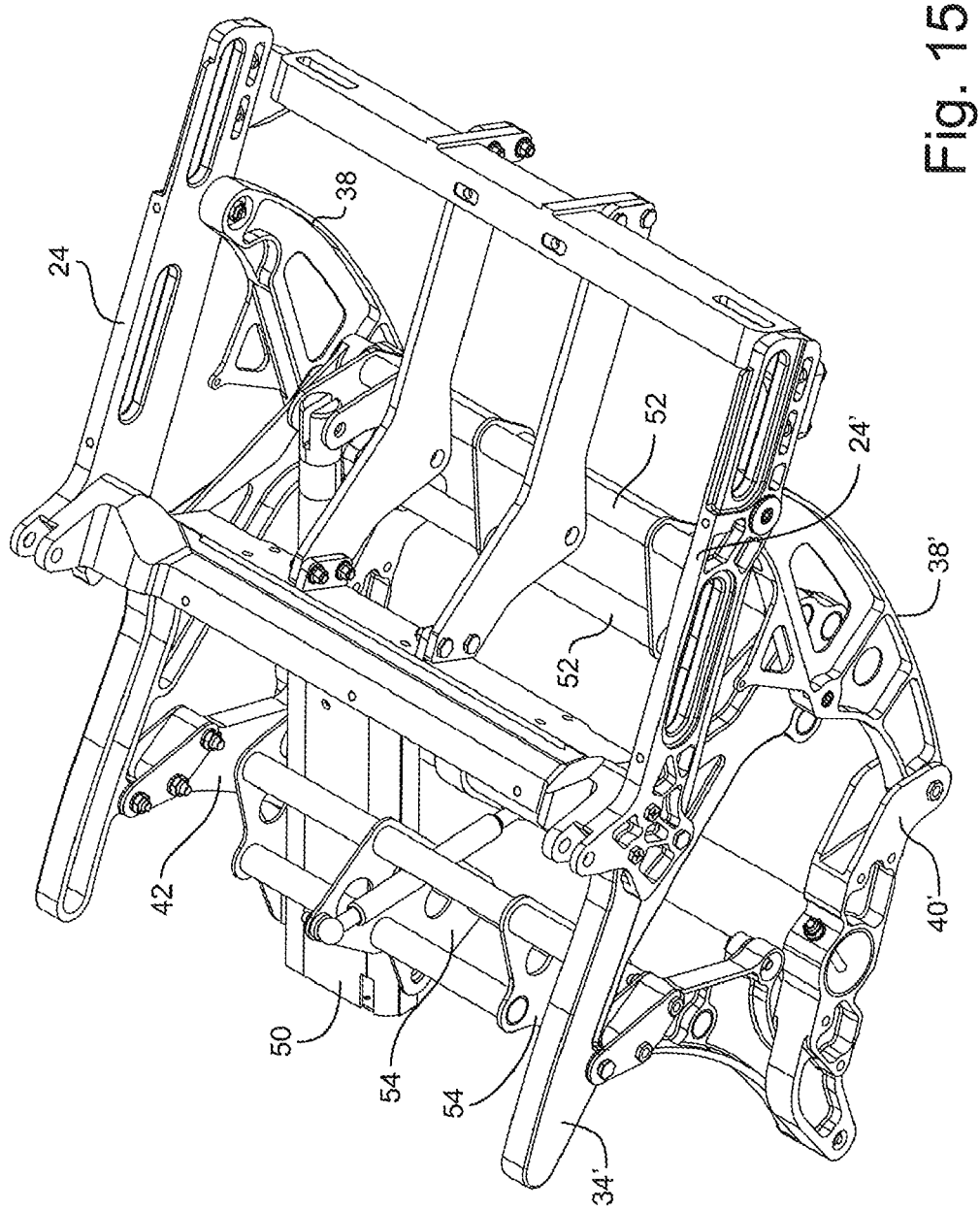
FIG. 15 is a second perspective view of the seat articulation mechanism of FIG. 14.
Figure 16:
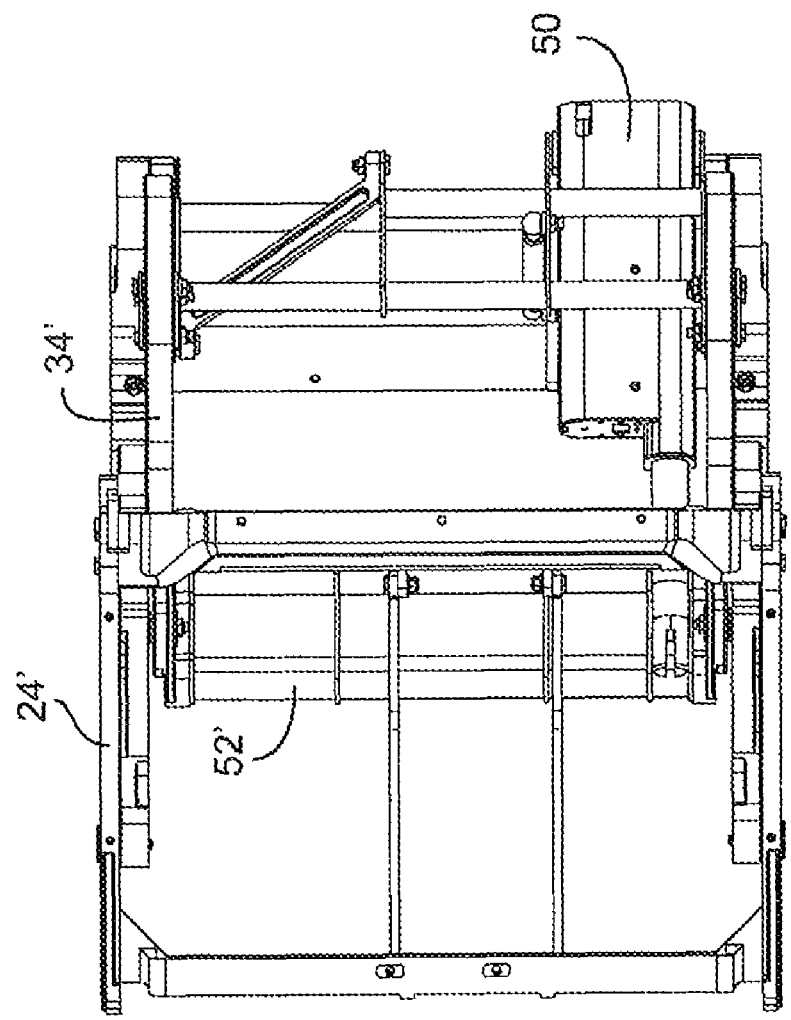
FIG. 16 is a top plan view of the seat articulation mechanism of FIG. 14.
Figure 18:
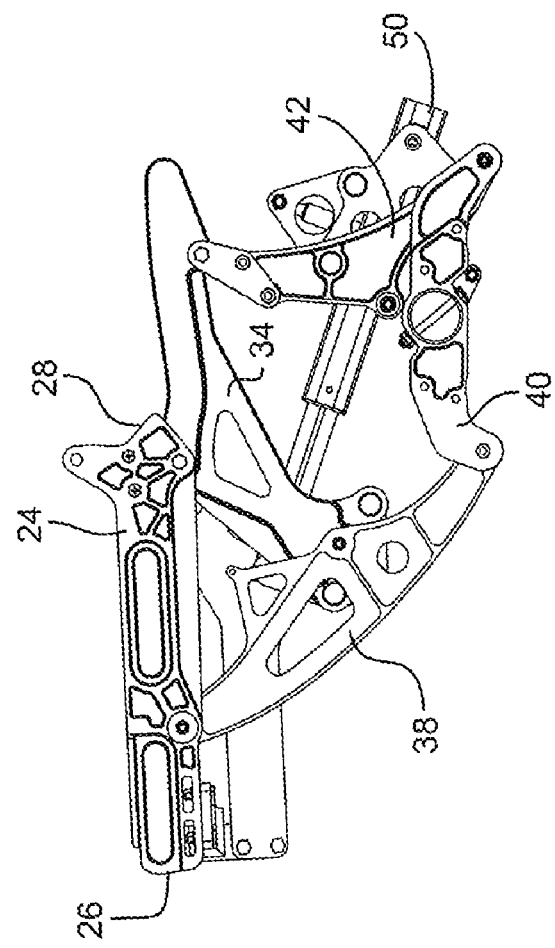
FIG. 18 is a side elevation view of the seat articulation mechanism of FIG. 14.
Figure 17:
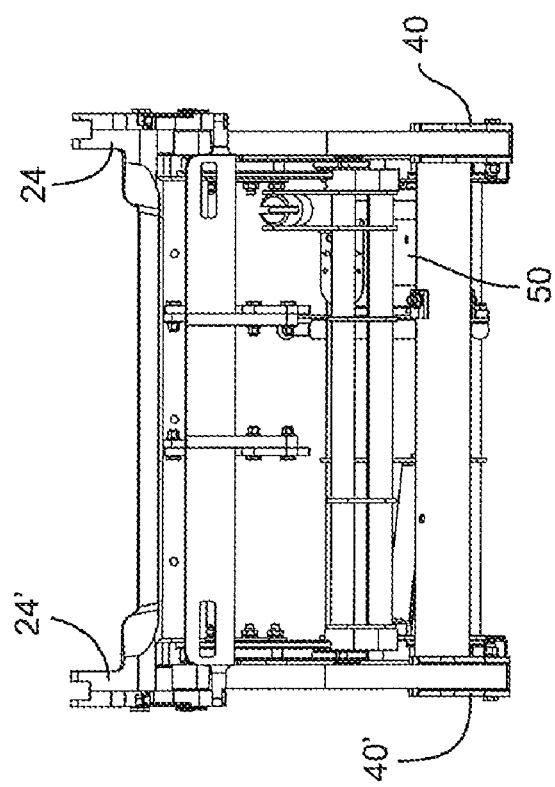
FIG. 17 is a front elevation view of the seat articulation mechanism of FIG. 14.

Referring to FIG. 13, the seat 20 is shown in the sleeping configuration in which the seat pan member 24, seat back 46 and leg rest 48 are positioned generally coplanar and horizontal. The movement of the seat pan member 24 causes the first end 26 (i.e. forward end) to lower and move forward relative to the lounge and upright configurations to provide a generally horizontal position and more room between the seat pan member 24 and a back shell associated with the seat. As shown, as the seat pan member 24 translates from the lounge to the sleeping configuration, the seat pan member 24 moves forward relative to the seat pan articulation linkage 34 and the roller 30 travels to the forward most end within the pathway 36. Thus, the length of the pathway 36 may be predetermined such that translation of the roller 30 from one end to the other properly positions the seat pan member 24 in the upright and sleeping positions, and the angle of the pathway 36 therebetween the opposing ends is angled to provide the desired seat pan member angle in the lounge position. Although only one lounge position is described herein, it is envisioned that the pathway 36 may define multiple, stopped lounge positions for more choices for passenger comfort.

In the sleeping configuration, the ends of the main and secondary translation linkages 38, 42 connected to the seat pan member 24 and seat pan articulation linkage 34 pivot forward relative to the stationary frame member 40, thus lowering the height of the seat pan member 24 from the lounge configuration. As the main translation linkage 38 has a greater length than the secondary translation linkage 42, the first end 26 of the seat pan member 24 is lowered at a greater rate than the second end 28 such that the seat pan member 24 is positioned generally horizontal in the sleeping configuration.

The seat pan member 24 is stopped in the sleeping configuration by the end of the pathway 36 and locked in the sleeping configuration by the secondary translation linkage 42 and the linear actuator 50.

Referring to FIGS. 14-18, various perspective and elevation views of the seat articulation mechanism 22 in the sleeping configuration are shown and correspond to FIGS. 2-6 and FIGS. 8-12.

While a seat articulation mechanism has been described with reference to specific embodiments and examples, it is envisioned that various details of the invention may be changed without departing from the scope of the invention. Furthermore, the foregoing description of the preferred embodiments of the invention and best mode for practicing the invention are provided for the purpose of illustration only and not for the purpose of limitation.

What is claimed is:

1. A seat articulation mechanism, comprising:
   first and second seat pan members each having first and second opposed ends and including a seat pan roller positioned about the second end of the first and second seat pan members;
   first and second seat pan articulation linkages each defining an articulation control pathway along which the seat pan rollers travel as the seat articulation mechanism translates between an upright and a sleeping configuration through a lounge configuration;
   first and second main translation linkages pivotally connected to the first and second seat pan members, the first and second seat pan articulation linkages, and first and second stationary frame members, respectively;
   first and second secondary translation linkages pivotally connected to the first and second seat pan articulation linkages and the first and second stationary frame members; and
   an actuator for driving the motion of at least one of the first and second main and secondary translation linkages to drive the mechanism between the upright and sleeping configurations through the lounge configuration.

2. The seat articulation mechanism according to claim 1, wherein the first and second seat pan members translate forward relative to the first and second seat pan articulation linkages as the seat articulation mechanism translates between the upright and sleeping configurations.

3. The seat articulation mechanism according to claim 1, wherein the first ends of the first and second seat pan members move upwardly in the lounge configuration relative to their position in the upright configuration, and move downwardly in the sleeping configuration relative to their position in the upright configuration.

4. The seat articulation mechanism according to claim 1, wherein the articulation control pathways cooperatively control the angle of the first and second seat pan members.

5. The seat articulation mechanism according to claim 1, wherein the first and second main translation linkages pivotally connect to the first and second seat pan members about intermediate their first and second opposed ends.

6. The seat articulation mechanism according to claim 1, wherein the articulation control pathways may be modified to provide different angle configurations for the lounge configuration.

7. The seat articulation mechanism according to claim 1, further comprising a seat back pivotally connected to the first and second seat pan members.

8. A seat articulation mechanism, comprising:
   a seat pan member having first and second opposed ends and having a seat pan roller for facilitating movement attached about the second end;
   a seat pan articulation linkage defining an articulation control pathway along which the seat pan roller travels as the seat articulation mechanism translates between an upright and a sleeping configuration through a lounge configuration;
   a main translation linkage pivotally connected to the seat pan member, the seat pan articulation linkage, and a stationary frame member;
   a secondary translation linkage pivotally connected to the seat pan articulation linkage and the stationary frame member; and
   an actuator for driving the motion of at least one of the main and the secondary translation linkages to drive the mechanism between the upright and sleeping configurations through the lounge configuration.

9. The seat articulation mechanism according to claim 8, wherein the seat pan member translates forward relative to the seat pan articulation linkage as the seat articulation mechanism translates between the upright and sleeping configurations.

10. The seat articulation mechanism according to claim 8, wherein the first end of the seat pan member moves upwardly in the lounge configuration relative to its position in the upright configuration, and moves downwardly in the sleeping configuration relative to its position in the upright configuration.

11. The seat articulation mechanism according to claim 8, wherein the articulation control pathway controls the angle of the seat pan member.

12. The seat articulation mechanism according to claim 8, wherein the main translation linkage pivotally connects to the seat pan member about intermediate the first and second opposed ends.

13. The seat articulation mechanism according to claim 8, wherein the articulation control pathway may be modified to provide different angle configurations for the lounge configuration.

14. The seat articulation mechanism according to claim 8, further comprising a seat back pivotally connected to the seat pan member.

15. A passenger seat, comprising:
   a seat articulation mechanism comprising:
      first and second seat pan members cooperatively supporting a seat bottom with each including a seat pan roller positioned about one end of the first and second seat pan members;
      first and second seat pan articulation linkages each defining an articulation control pathway along which the seat pan rollers travel as the mechanism translates between an upright and a sleeping configuration through a lounge configuration;
      first and second main translation linkages pivotally connected to the first and second seat pan members, the first and second seat pan articulation linkages, and first and second stationary frame members, respectively;
      first and second secondary translation linkages pivotally connected to the first and second seat pan articulation linkages and the first and second stationary frame members; and an actuator for driving the motion of at least one of the first and second main and secondary translation linkages to drive the mechanism between the upright and sleeping configurations through the lounge configuration;

a seat back pivotally connected to the first and second seat pan members configured to pivot between an upright position and a generally horizontal sleeping position; and a leg rest configured to move between an upright position and a generally horizontal sleeping position.

16. The passenger seat according to claim 15, wherein the first and second seat pan members translate forward relative to the first and second seat pan articulation linkages as the seat articulation mechanism translates between the upright and sleeping configurations.

17. The passenger seat according to claim 15, wherein forward ends of the first and second seat pan members move upwardly in the lounge configuration relative to their position in the upright configuration, and move downwardly in the sleeping configuration relative to their position in the upright configuration.

18. The passenger seat according to claim 15, wherein the articulation control pathways cooperatively control the angle of the first and second seat pan members.

19. The passenger seat according to claim 15, wherein the articulation control pathways may be modified to provide different angle configurations for the lounge configuration.

* * * * *